(12) United States Patent
Bhatt et al.

(10) Patent No.: US 9,087,121 B2
(45) Date of Patent: *Jul. 21, 2015

(54) SOLVING PROBLEMS IN DATA PROCESSING SYSTEMS BASED ON TEXT ANALYSIS OF HISTORICAL DATA

(75) Inventors: Dhruv A. Bhatt, Indian Trail, NC (US); Kristin E. McNeil, Charlotte, NC (US); Nitaben A. Patel, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/445,137

(22) Filed: Apr. 12, 2012

(65) Prior Publication Data

US 2013/0275392 A1 Oct. 17, 2013

(51) Int. Cl.
*G06F 17/30* (2006.01)

(52) U.S. Cl.
CPC .................. *G06F 17/30657* (2013.01)

(58) Field of Classification Search
CPC .................................................. G06F 17/30657
USPC ........................................................ 707/692
See application file for complete search history.

(56) References Cited

U.S. PATENT DOCUMENTS

| 6,571,236 | B1* | 5/2003 | Ruppelt | 714/25 |
|---|---|---|---|---|
| 7,536,368 | B2 | 5/2009 | Todhunter | |
| 7,653,610 | B2 | 1/2010 | Abrashkevich et al. | |
| 2004/0010505 | A1 | 1/2004 | Vishnubhotla | |
| 2005/0278340 | A1 | 12/2005 | Rehberg et al. | |
| 2007/0011128 | A1 | 1/2007 | Meyers | |
| 2007/0061128 | A1* | 3/2007 | Odom et al. | 704/4 |
| 2008/0140684 | A1 | 6/2008 | O'Reilly et al. | |
| 2009/0063387 | A1 | 3/2009 | Beaty et al. | |

(Continued)

FOREIGN PATENT DOCUMENTS

| JP | 11219297 A | 8/1999 |
|---|---|---|
| NL | 1013193 C2 | 4/2001 |

OTHER PUBLICATIONS

Egner et al., "UIMA GRID: Distributed Large-Scale Text Analysis", CCGRID 7th IEEE International Symposium on, May 14-17, 2007, pp. 317-326.*

(Continued)

*Primary Examiner* — Etienne Leroux
*Assistant Examiner* — Jared Bibbee
(74) *Attorney, Agent, or Firm* — Mollborn Patents, Inc.; Fredrik Mollborn

(57) ABSTRACT

Computer program products and systems, determine solutions to a problem experienced by a data processing system user. A query is received from the user. The query includes a problem description of the problem experienced by the user with respect to the data processing system. One or more keywords are extracted from the received problem description. An index of problems and associated solutions is searched using the one or more extracted keywords. The index of problems and associated solutions is created by analyzing a document collection describing problems and associated solutions with a text analytics application. One or more documents are returned that contains words or phrases that are similar to the keywords used for searching the index of problems and associated solutions. The documents relevant for the problem and associated solutions are presented to the user.

14 Claims, 3 Drawing Sheets

(56) References Cited

U.S. PATENT DOCUMENTS

2011/0055699 A1* 3/2011 Li et al. .................. 715/709
2011/0161274 A1 6/2011 Gao et al.

OTHER PUBLICATIONS

U.S. Appl. No. 13/570,849 Non-Final Office Action. Notification Date Jan. 25, 2013.

U.S. Appl. No. 13/570,849 Final Office Action. Notification Date May 9, 2013.
U.S. Appl. No. 13/570,849 Non-Final Office Action. Notification Date Dec. 6, 2013.
U.S. Appl. No. 13/570,849 Non-Final Office Action. Notification Date Apr. 21, 2014.
U.S. Appl. No. 13/570,849 Non-Final Office Action. Notification Date Oct. 10, 2014.

* cited by examiner

SOLVING PROBLEMS IN DATA PROCESSING SYSTEMS BASED ON TEXT ANALYSIS OF HISTORICAL DATA

BACKGROUND

The various embodiments of the present invention relate to data processing systems, and more specifically, to problem solving in data processing systems. Historical data can often contain useful information and it is possible learn much from history and from other individuals' past experiences. In particular in the area of data processing, it is relatively common that several users experience the same or similar problems with respect to various issues. However, when trying to solve the problem, it is not very common, for various reasons, to examine historical data. Often users do not even know where to look or how to access historical data for problem solving purposes. As a result, they end up "reinventing the wheel", and wasting time whenever they try to solve a problem that is similar to a problem that has previously occurred and that might already have been solved by somebody else.

If a user searches for a solution to a problem using a search engine on the Internet, the user typically needs to go through a long list of websites that the search engine returns, and search among the websites in this list for a possible solution to her problem. Many of the search results may not even provide a solution to the problem.

In addition, companies and various organizations end up spending significant amounts of human resources on problem solving tasks, as people tend to have a high likelihood of forgetting the details about the prior problem, or there being different personnel involved in the different situations. Such situations could be avoided or at least reduced if problems that have already occurred could be solved more efficiently, and likely result in significant cost savings for companies and other organizations. Thus, there is a need for a quick way to capture historical problems and solutions and propose possible solutions.

SUMMARY

According to the various embodiments of the present invention, computer program products and systems are provided, which implement and use techniques for determining solutions to a problem experienced by a data processing system user. A query is received from the user. The query includes a problem description of the problem experienced by the user with respect to the data processing system. One or more keywords are extracted from the received problem description. An index of problems and associated solutions is searched using the one or more extracted keywords. The index of problems and associated solutions is created by analyzing a document collection describing problems and associated solutions with a text analytics application. One or more documents are returned that contains words or phrases that are similar to the keywords used for searching the index of problems and associated solutions. The documents relevant for the problem and associated solutions are presented to the user.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
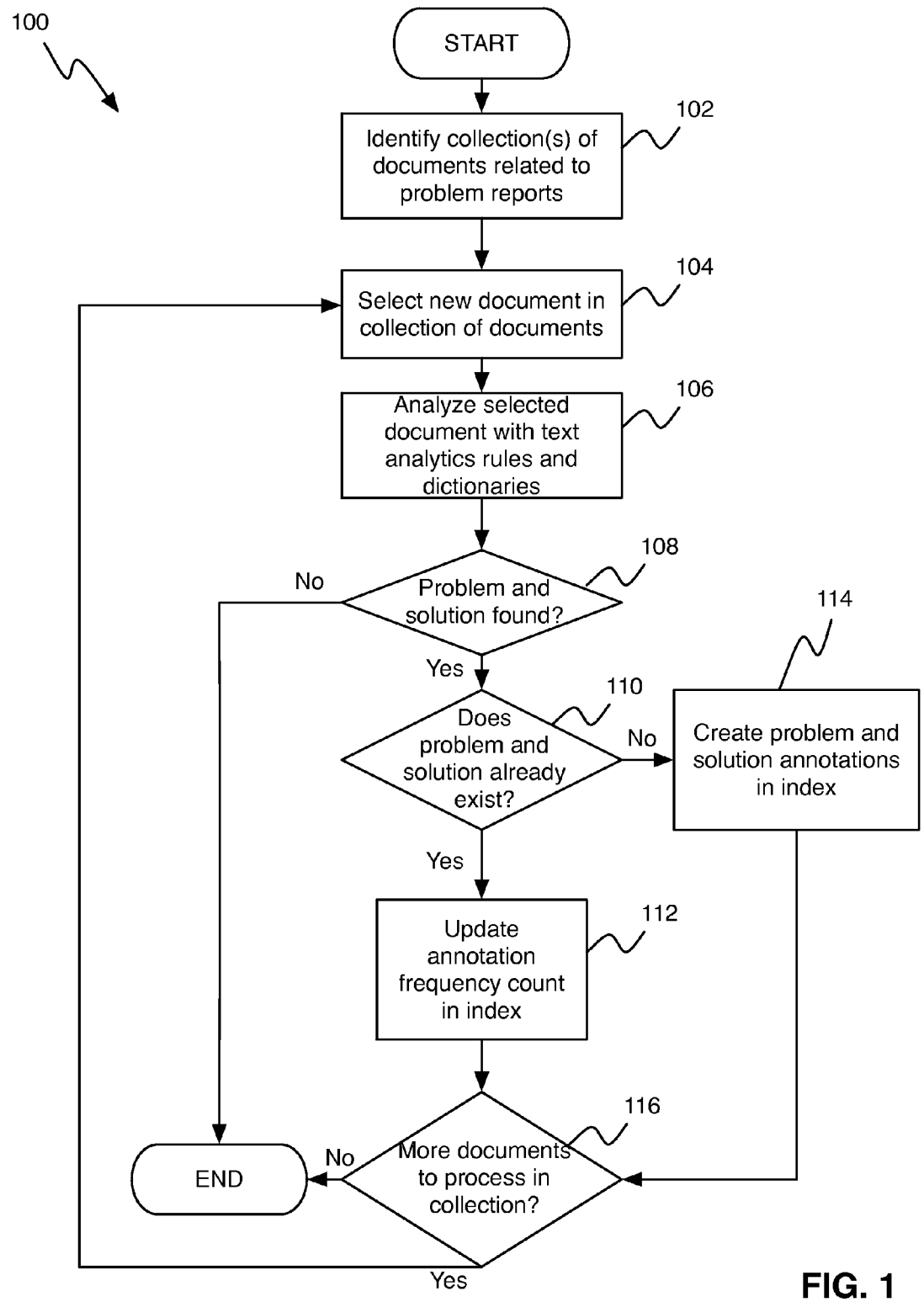
FIG. 1 shows a process for identifying problems and their corresponding solutions in a collection of documents, in accordance with one embodiment.

As was described above, the various embodiments of the present invention relate to data processing systems, and more specifically, to problem solving in various types of data processing systems. By analyzing historical data from databases, such as patient records databases, bug report databases, etc., using dictionaries and parsing rules of text analytics, it is possible to identify sets of problems and their corresponding solutions. Once the problems and their solutions have been identified, they can be indexed and searched by users. Thus, if a user experiences a particular problem and a similar problem can be identified among the analyzed historical data, then the solution for that problem can be readily presented to the user. In some embodiments, in the event that more than one solution is found, the solutions can be presented to the user based on various factors, such as correlations and frequency, for example.

Many advantages can be obtained in accordance with various embodiments of the invention. For example, users do not have to find solutions to problems that have been solved in the past. Instead, they can simply look up the existing solution. Users do not need to go through a list of search engine results manually to figure out which problem is most similar to the problem they are experiencing, if solution is available, and figure out which solution is more appropriate or frequent, in the event of that multiple solutions are offered. This can result in significant time savings for the user. Users do not need to go through question and answer sessions in an expert system, which is a relatively common conventional problem solving technique. Furthermore, as text analytics techniques are used, the solutions can be found in any type of document collections, such as blogs, user forums, error reports, etc., so a large body of knowledge of problem statements and solutions can be efficiently searched by the user. Altogether, these factors result in faster and more consistent results in determining solutions to experience problems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, or various types of scripting languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a process (100) for identifying problems and their corresponding solutions in a collection of documents, in accordance with one embodiment. As was described above, the collection of documents can be of any kind, such as forums, problem reports, blogs, emails, product manuals and documentation, etc. Those of ordinary skill in the art can envision many other types of document collections as well.

As can be seen in FIG. 1, the process (100) starts by identifying one or more collections of documents related to problem reports (step 102). As was described above, these collections of documents can originate from various sources, such as forums, problem reports, blogs, emails, product manuals and documentation, etc. Next, a document in the collection of documents is selected (step 104).

The selected document is then analyzed using text analytics, for example, Unstructured Information Management Applications (UIMA), rules and dictionaries (step 106). On a general level, UIMA can be described as software systems that analyze large volumes of unstructured information in order to discover knowledge that is relevant to an end user. For example, a UIMA might ingest plain text and identify entities, such as persons, places, organizations; or relations, such as works-for or located-at. To achieve this, the UIMA decomposes the text into components, for example "language identification"=>"language specific segmentation"=>"sentence boundary detection"=>"entity detection (person/place names etc.)". Each component implements interfaces defined by the framework and provides self-describing metadata via XML descriptor files. The framework manages these components and the data flow between them. Components can be written in, for example, the Java or the C++programming languages. (Java and all Java-based trademarks and logos are trademarks or registered trademarks of Oracle and/or its affiliates.) The data that flows between components is designed for efficient mapping between these languages.

As is well known to those of ordinary skill in the art, text analytics processing contains one or more annotators that include multiple rules and dictionaries for identifying problems and solutions. For instance, a "Problem Dictionary" can contain trigger words that indicate that the particular sentence describes a problem. Some examples of trigger words or phrases that can be used to identify a problem include "doesn't work", "issue", "broken", "fails", "exception occurs", "crash", "out of memory", etc.

Similar to the Problem Dictionary, a "Solution Dictionary" can be provided, which can contain trigger words or phrases that identify a solution to the problem, such as "we tried", "the solution was", "changing . . . works", "solved", etc.

Various text analytics rules can also be provided that describe how to use the Problem Dictionary and the Solution Dictionary, respectively. There may, for example, be a text analytics rules that states: "if a sentence starts with the term 'the solution was', then the solution annotator determines the solution within the document." Those of ordinary skill in the art can envision many variations of text analytics rules.

Next, the process determines whether a problem and associated solution was found during the analysis step (step 108).

If a problem-solution combination is not found, then the process ends. If a problem-solution(s) combination was found, then the process proceeds to step 110, in which it is determined whether the problem-solution combination is a new problem-solution or an already existing problem-solution combination. This determination can be made by consulting an index in which problem-solution combinations are cataloged. The index can be of any conventional type of database index that is familiar to those of ordinary skill in the art, such as a bitmap index, a dense index, a sparse index, or a reverse index, just to mention a few examples.

If the problem-solution combination already exists in the index, then the frequency counter for the problem-solution is increased in the index (step 112). If the problem and solution combination does not exist in the index, then a new annotation for the problem-solution combination is created and added to the index (step 114).

After completing steps 112 and 114, respectively, the process continues to step 116, in which it examines whether there are any more documents to process in the document collection. If there are more unprocessed documents in the document collection, then the process returns to step 104, where a new document is selected and processing continues as described above. If there are no further documents in the collection, then the process (100) ends. This process (100) can be completed for as many document collections as feasible or necessary to create a database of problems and their corresponding solutions, depending on the particular situation or environment in which the process is implemented.

Figure 2:
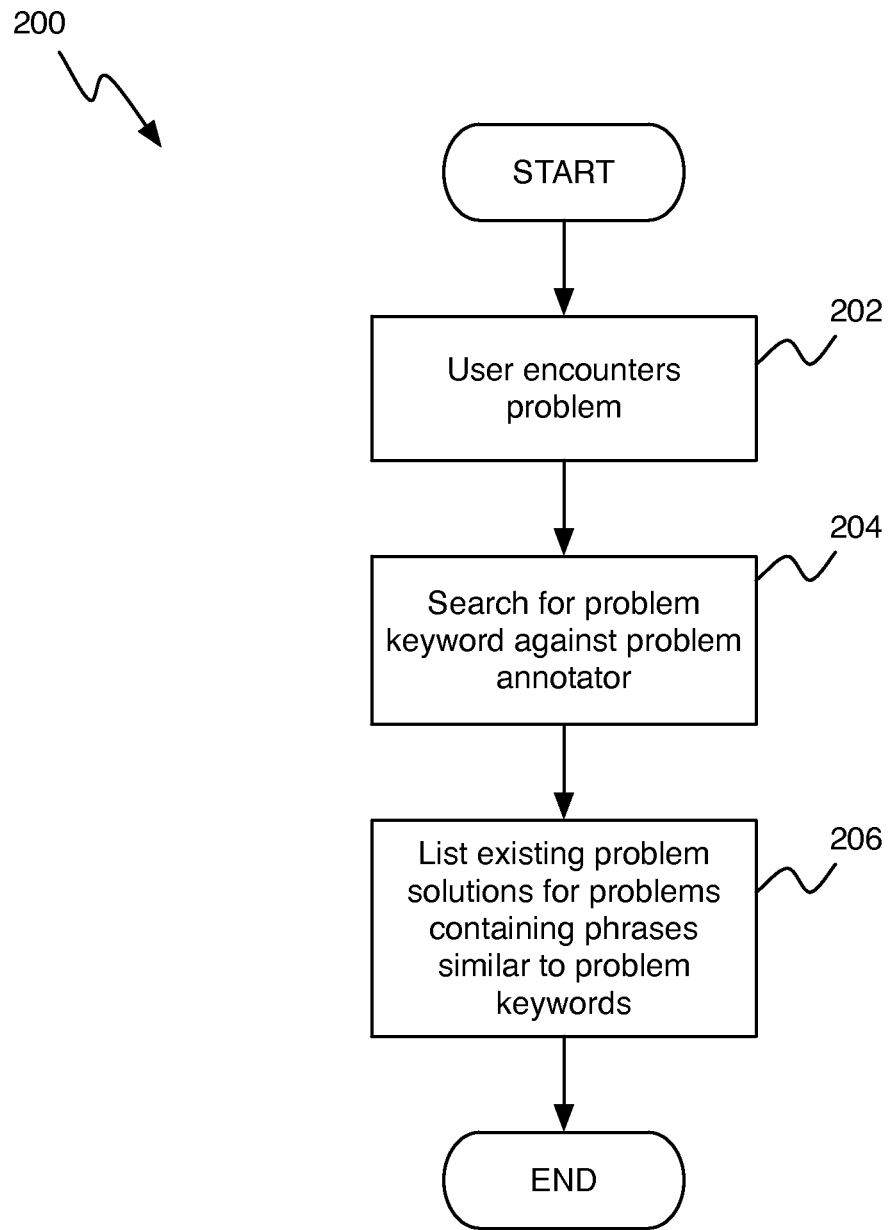
FIG. 2 shows a process for using an index of problem-solution combinations to identify a solution to an experienced problem, in accordance with one embodiment.

Next, a process (200) for finding a solution for a given problem, based on past history of problems and solutions, will be described with reference to FIG. 2. As can be seen in FIG. 2, the process (200) starts by a user experiencing some kind of problem that she would like to solve (step 202). The user inputs the problem search string into the data processing system. One or more keywords are then identified using pre-existing search techniques and the problem annotator created in process (100) is searched using the keywords (step 204).

Finally, the documents that contain the problem-solution combinations with phrases or words that are similar to the keywords are presented to the user (step 206), which ends the process (200). As the skilled person realizes, the documents can be presented in a variety of ways, such as a list containing small excerpts of the contents of the documents, icons, etc. The problem-solution documents can also be ranked based on various factors. For example, solutions that are more frequent (and thus likely better) can be presented to the user before less common solutions (which may not work as well) are presented to the user. In some embodiments, users can vote or otherwise rank solutions, thus making the better solutions more readily available to other users.

Figure 3:
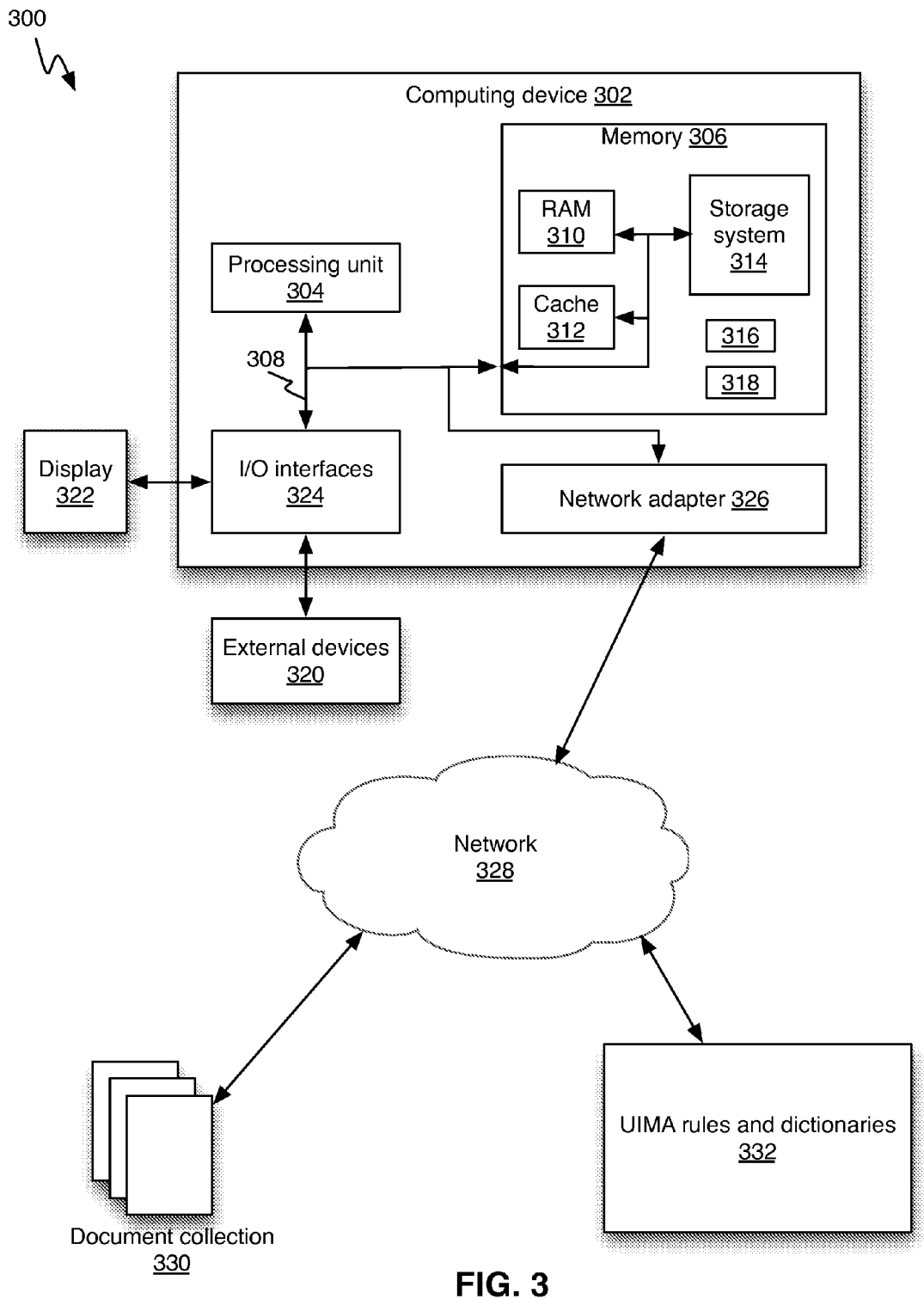
FIG. 3 shows a schematic example of a system (300) in accordance with one embodiment.

FIG. 3 shows a schematic of an example of a system (300) for determining solutions to a problem experienced by a user with respect to a data processing system in accordance with one embodiment. The system (300) shown in FIG. 3 is only one example of a suitable system and is not intended to suggest any limitation as to the scope of use or functionality of embodiments of the invention described herein. Regardless, the system (300) is capable of being implemented and/or performing any of the functionality set forth hereinabove.

In the embodiment shown in FIG. 3, the system (300) is shown in the form of a general-purpose computing device (302). The components of the computing device (302) may include, but are not limited to, one or more processors or processing units (304), a system memory (306), and a bus (308) that couples various system components including the system memory (306) to the processor (304).

The bus (308) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computing device (302) typically includes a variety of computer system readable media. Such media may be any available media that is accessible by the computing device (302) and it includes both volatile and non-volatile media, removable and non-removable media.

The memory (306) can include computer system readable media in the form of volatile memory, such as a random access memory (RAM) (310) and/or a cache memory (312). The computing device (302) may further include other removable/non-removable, volatile/non-volatile computer system storage media. By way of example only, a storage system (314) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (308) by one or more data media interfaces. The memory (306) may include at least one program product having a set (e.g., at least one) of program modules that are configured to carry out the functions of embodiments of the invention.

A program/utility (316), having a set (at least one) of program modules (318), may be stored in the memory (306) by way of example, and not limitation, as well as an operating system, one or more application programs, other program modules, and program data. Each of the operating system, one or more application programs, other program modules, and program data or some combination thereof, may include an implementation of a networking environment. The program modules (318) generally carry out the functions and/or methodologies of embodiments of the invention as described herein. The computing device (302) may also communicate with one or more external devices (320) such as a keyboard, a pointing device, a display (322), etc.; one or more devices that enable a user to interact with the computing device (302); and/or any devices (e.g., network card, modem, etc.) that enable the computing device (302) to communicate with one or more other computing devices. Such communication can occur via Input/Output (I/O) interfaces (324). Still yet, the computing device (302) can communicate with one or more networks such as a local area network (LAN), a general wide area network (WAN), and/or a public network (e.g., the Internet) (328) through a network adapter (326). As depicted, the network adapter (326) communicates with the other components of the computing device (302) through the bus (308). It should be understood that although not shown, other hardware and/or software components could be used in conjunction with the computing device (302). Examples, include, but are not limited to: microcode, device drivers, redundant processing units, external disk drive arrays, RAID systems, tape drives, and data archival storage systems, etc.

As shown in FIG. 3, a document collection (330) is accessed through the network (328), but it should be realized that the document collection (330) does not need to be external to the computing device (302), but can also be stored internally in the memory (306) of the computing device (302). Various combinations of internal and external document collections (330) can also be used. It should further be noted that for simplicity, FIG. 3 only shows a single document collection (330), although in a real-life implementation, typically large numbers of document collections (330) may be present.

FIG. 3 also shows a collection of UIMA rules and dictionaries (332) that is accessed through the network (328), but it should be realized that the UIMA rules and dictionaries (332) do not need to be external to the computing device (302), but can also be stored internally in the memory (306) of the computing device (302). Various combinations of internal and external UIMA rules and dictionaries (332) can also be used. It should further be noted that for simplicity, FIG. 3 only shows a single collection of UIMA rules and dictionaries (332), although in some implementations there may be multiple collections (332) that are used for various purposes.

It should be noted that the embodiments described above are merely examples and that many variations and modifications can be made by those of ordinary skill in the art. For example, some embodiments may contain an "expert feedback mechanism" that permits a qualified or certified user to explicitly enter a specific problem and a corresponding problem solution into the data processing system, rather than searching through a collection of documents. Upon submission, the user's problem and solution are added to the data index and can then be searched, as described above. Optionally the problem and solution can be "flagged" such that it is clear to the user that it is a problem and solution combination that has been explicitly entered by a qualified user, thus providing the end user with an indication of the trustworthiness of the proposed solution.

In some embodiments, there may be an "exception mechanism" that enables a qualified or certified user to tag a particular problem-solution combination so that the solution will not be suggested in the future, in the event that the "solution" does not work for whatever reason. For example, the user can input a tag that generates a flag associated with the document in the data processing system. Then, at some later point, all flagged documents can be reviewed and the document can be removed from the collection of documents if the "solution" is indeed incorrect.

In some embodiments there may be a "transparency mechanism" in which a reference, such as a link to the original document, is also provided when the solution is provided to the user. Clicking on the link will open the document, so the user can see the solution in its original context, which may in some cases provide additional useful information to the user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product for determining solutions to a problem experienced by a user with respect to a data processing system, the computer program product comprising:
   a computer readable storage medium having computer readable program code embodied therewith, the computer readable program code comprising:
   computer readable program code configured to select a collection of documents;
   computer readable program code configured to analyze the text in each document using plain text analysis and an unstructured information management application containing text analytics rules to identify problems and associated solutions, the plain text analysis using a problem dictionary containing words and phrases that identify sentences describing problems and a solution dictionary containing words and phrases that identify sentences describing solutions to problems;
   computer readable program code configured to create a searchable index of problems and associated solutions and storing the index in a database;
   computer readable program code configured to receive a problem description from a user of the problem experienced by the user with respect to the data processing system, after creating the searchable index;
   computer readable program code configured to analyze the received problem description using plain text analysis to extract one or more keywords from the problem description;
   computer readable program code configured to search the index of problems and associated solutions using the one or more extracted keywords;
   computer readable program code configured to return one or more documents containing words or phrases that are similar to the one or more extracted keywords; and computer readable program code configured to present the documents relevant for the problem and associated solutions to the user.

2. The computer program product of claim 1, wherein:
the collection of documents is a collection of documents related to problem reports.

3. The computer program product of claim 1, wherein the computer readable program code configured to present the documents includes:
computer readable program code configured to organize the documents relevant for the problem and associated solutions based on a correlation of keywords and frequency of solutions.

4. The computer program product of claim 1, wherein the document collection includes one or more of: forums, problem reports, blogs, emails, product manuals and product documentation.

5. The computer program product of claim 1, further comprising:
computer readable program code configured to receive a user input associating a problem and a solution; and
computer readable program code configured to update the index of problems and associated solutions with the received user input.

6. The computer program product of claim 1, further comprising:
computer readable program code configured to receive a user input identifying erroneous solutions to a problem; and
computer readable program code configured to remove erroneous solutions from the index of problems and associated solutions, based on the received user input.

7. The computer program product of claim 1, wherein the computer readable program code configured to present the documents includes:
computer readable program code configured to include a reference to the original source of a problem and associated solution that is retrieved from the index of problems and associated solutions.

8. A system for determining solutions to a problem experienced by a user with respect to a data processing system, comprising:
a processor;
a memory storing instructions operable to be executed by the processor, wherein the instructions include instructions to:
select a collection of documents;
analyze the text in each document using plain text analysis and an unstructured information management application containing text analytics rules to identify problems and associated solutions, the plain text analysis using a problem dictionary containing words and phrases that identify sentences describing problems and a solution dictionary containing words and phrases that identify sentences describing solutions to problems;
create a searchable index of problems and associated solutions and storing the index in a database;
receive a problem description from a user of the problem experienced by the user with respect to the data processing system, after creating the searchable index;
analyze the received problem description using plain text analysis to extract one or more keywords from the problem description;
search the index of problems and associated solutions using the one or more extracted keywords;
return one or more documents containing words or phrases that are similar to the one or more extracted keywords; and
present the documents relevant for the problem and associated solutions to the user.

9. The system of claim 8, wherein:
the collection of documents is a collection of documents related to problem reports.

10. The system of claim 8, wherein the instructions to present the documents include instructions to organize the documents relevant for the problem and associated solutions based on a correlation of keywords and frequency of solutions.

11. The system of claim 8, wherein the document collection includes one or more of: forums, problem reports, blogs, emails, product manuals and product documentation.

12. The system of claim 8, wherein the memory further comprises instructions to:
receive a user input associating a problem and a solution; and
update the index of problems and associated solutions with the received user input.

13. The system of claim 8, wherein the memory further comprises instructions to:
receive a user input identifying erroneous solutions to a problem; and
remove erroneous solutions from the index of problems and associated solutions, based on the received user input.

14. The system of claim 8, wherein the instructions to present the documents include instructions to include a reference to the original source of a problem and associated solution that is retrieved from the index of problems and associated solutions.

* * * * *